(12) United States Patent
Hauth et al.

(10) Patent No.: US 8,182,046 B1
(45) Date of Patent: May 22, 2012

(54) SECURING MECHANISMS FOR BOTTOM DUMP TRAILERS

(76) Inventors: DeWayne Lee Hauth, Mexia, TX (US);
Jerry Glynn Berry, Mexia, TX (US);
Tom Gifford McKinley, Mexia, TX (US)

( * ) Notice: Subject to any disclaimer, the term of this patent is extended or adjusted under 35 U.S.C. 154(b) by 0 days.

(21) Appl. No.: 13/033,034

(22) Filed: Feb. 23, 2011

(51) Int. Cl.
*B60P 1/56* (2006.01)

(52) U.S. Cl. .......................................................... 298/29

(58) Field of Classification Search ............ 298/24, 298/27, 29–35 M
See application file for complete search history.

(56) References Cited

U.S. PATENT DOCUMENTS

| | | | |
|---|---|---|---|
| 714,483 A | 11/1902 | Haywood | |
| 747,808 A | 12/1903 | Tripp | |
| 968,511 A | 8/1910 | Collins | |
| 1,023,719 A | 4/1912 | Butler | |
| 1,506,131 A | 8/1924 | Nata | |
| 3,361,478 A | 1/1968 | Ross et al. | |
| RE33,835 E * | 3/1992 | Kime et al. | 239/657 |
| 5,224,761 A | 7/1993 | Hagenbuch | |
| 5,997,099 A | 12/1999 | Collins | |
| 6,021,608 A | 2/2000 | Ollison | |
| 6,302,491 B1 * | 10/2001 | Anderson | 298/23 S |
| 6,416,133 B2 | 7/2002 | Friesen | |
| 7,147,423 B2 * | 12/2006 | Golden et al. | 414/510 |
| 7,731,297 B1 * | 6/2010 | Ozanich | 298/7 |
| 2007/0182237 A1 * | 8/2007 | Brown et al. | 298/23 M |

FOREIGN PATENT DOCUMENTS

GB     190705544 A     0/1907

* cited by examiner

*Primary Examiner* — H Gutman
(74) *Attorney, Agent, or Firm* — Afghani Law Firm; Kevin Afghani (57) ABSTRACT

In one embodiment, a securing mechanism for a gate of a bottom dump trailer includes a first securing mechanism portion adapted to be coupled to a first door of the gate of the bottom dump trailer. The securing mechanism also includes a second securing mechanism portion adapted to be coupled to a second door of the gate of the bottom dump trailer. The second securing mechanism portion is engageable with the first securing mechanism portion when the gate is closed. The securing mechanism also includes an electrical actuator to move a component of the securing mechanism into a plurality of positions including a locked position and an unlocked position. The securing mechanism may restrain the gate from opening when the first securing mechanism portion is engaged to the second securing mechanism portion and the electrical actuator moves the component into the locked position.

10 Claims, 11 Drawing Sheets

SECURING MECHANISMS FOR BOTTOM DUMP TRAILERS

TECHNICAL FIELD

The illustrative embodiments relate generally to securing mechanisms, and more particularly, to securing mechanisms for bottom-dump trailers.

BACKGROUND

Bottom dump trailers, including belly-dump trailers and clam-shell type trailers, may be hitched to a vehicle, such as a truck, to haul a material from one location to another and dump the material at a desired location. In some situations, it may be undesirable or hazardous for the gate of the bottom dump trailer to open. For example, when the bottom dump trailer is traveling on a road and is filled with material, the opening of the bottom dump trailer can cause the material to spill out onto the road and create a hazard for surrounding drivers. There is a need for securing mechanisms to prevent bottom dump trailers from opening in these and other types of situations. Current securing mechanisms fail to provide a convenient and reliable way for drivers to secure the gate of their bottom dump trailers.

SUMMARY

According to an illustrative embodiment, a securing mechanism for a gate of a bottom dump trailer includes a first securing mechanism portion adapted to be coupled to a first door of the gate of the bottom dump trailer. The gate is movable into a plurality of positions including an open position and a closed position. The securing mechanism also includes a second securing mechanism portion adapted to be coupled to a second door of the gate of the bottom dump trailer. The second securing mechanism portion is engageable with the first securing mechanism portion when the gate is in the closed position. The securing mechanism also includes an electrical actuator adapted to use electrical energy to move a component of the securing mechanism into a plurality of positions including a locked position and an unlocked position. The securing mechanism restrains the gate from moving into the open position when the first securing mechanism portion is engaged to the second securing mechanism portion and the electrical actuator moves the component into the locked position.

According to another illustrative embodiment, a securing mechanism for a gate of a bottom dump trailer includes a pin adapted to be coupled to a first door of the gate of the bottom dump trailer, and a latch adapted to be rotatably coupled to a second door of the gate of the bottom dump trailer. The latch is movable into a plurality of positions including a locked position and an unlocked position. The latch includes a notch adapted to receive the pin when the latch is in the locked position. The securing mechanism also includes an electrical actuator adapted to use electrical energy to move the latch between the locked position and the unlocked position. The electrical actuator is further adapted to move, while the gate is closed, the latch into the locked position to engage the notch to the pin. The gate is restrained from opening when the notch and the pin are engaged.

According to another illustrative embodiment, a securing mechanism for a gate of a bottom dump trailer includes a pin support including a first inner plate and a first outer plate. The first inner plate is adapted to be coupled to a first door of the gate of the bottom dump trailer. The securing mechanism also includes a pin including a first end and a second end. The first end of the pin is coupled to the first inner plate and the second end of the pin is coupled to the first outer plate such that the pin is disposed between the first inner plate and the first outer plate. The securing mechanism also includes a latch pin support including a second inner plate and a second outer plate. The second inner plate is adapted to be coupled to a second door of the gate of the bottom dump trailer. The securing mechanism also includes a latch pin including a first end and a second end. The first end of the latch pin is coupled to the second inner plate and the second end of the latch pin is coupled to the second outer plate such that the latch pin is disposed between the second inner plate and the second outer plate. The securing mechanism also includes a latch rotatably coupled to the latch pin. The latch is movable into a plurality of positions including a locked position and an unlocked position. The latch includes a notch adapted to receive the pin when the latch is in the locked position. The securing mechanism also includes an electrical actuator adapted to use electrical energy to move the latch between the locked position and the unlocked position. The electrical actuator is adapted to be coupled to the second door of the gate. The electrical actuator is further adapted to move, while the gate is closed, the latch into the locked position such that the notch receives the pin. The gate is restrained from opening when the notch receives the pin.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1A:
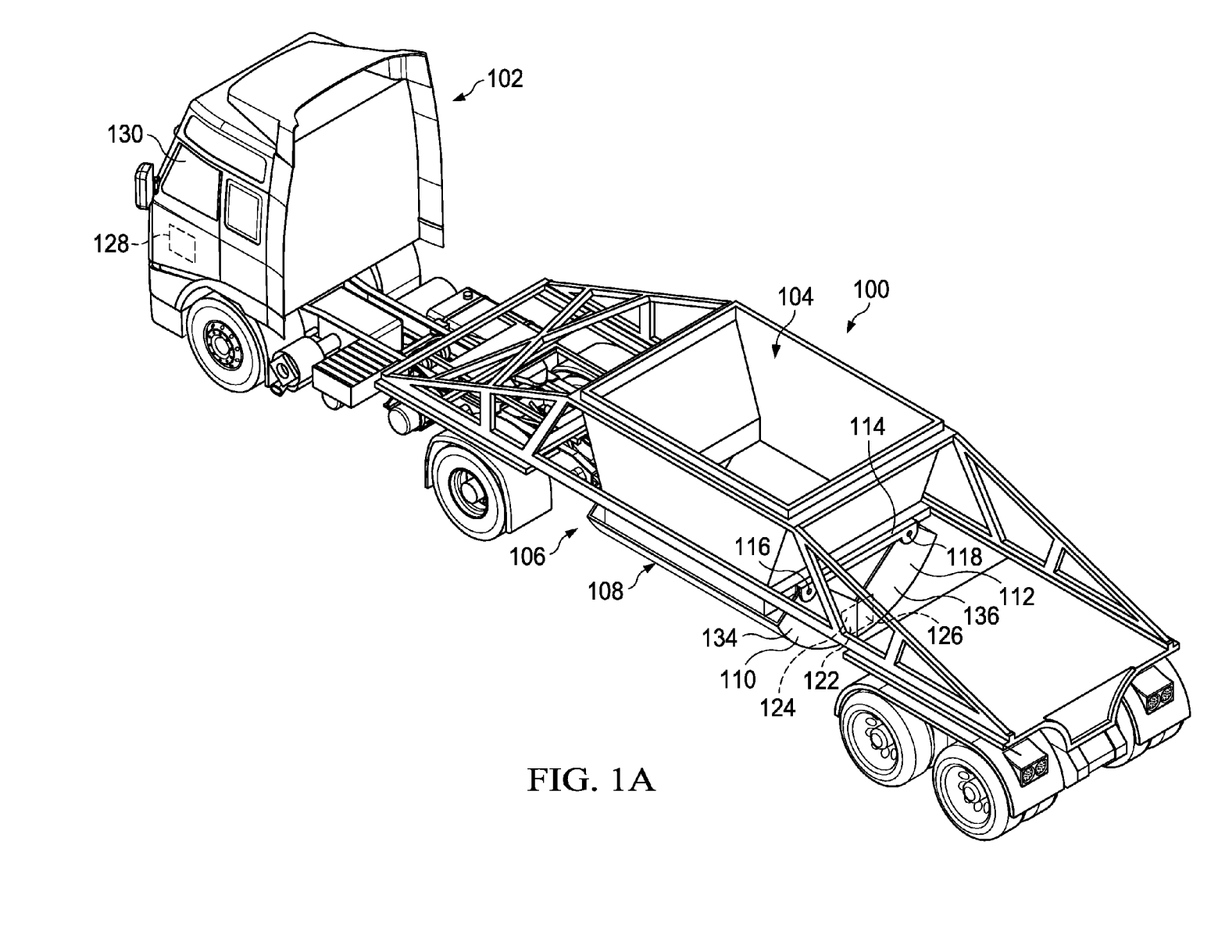
FIG. 1A is a schematic, perspective view and non-limiting example of a bottom dump trailer and vehicle on which the illustrative embodiments may be implemented.
Figure 1B:
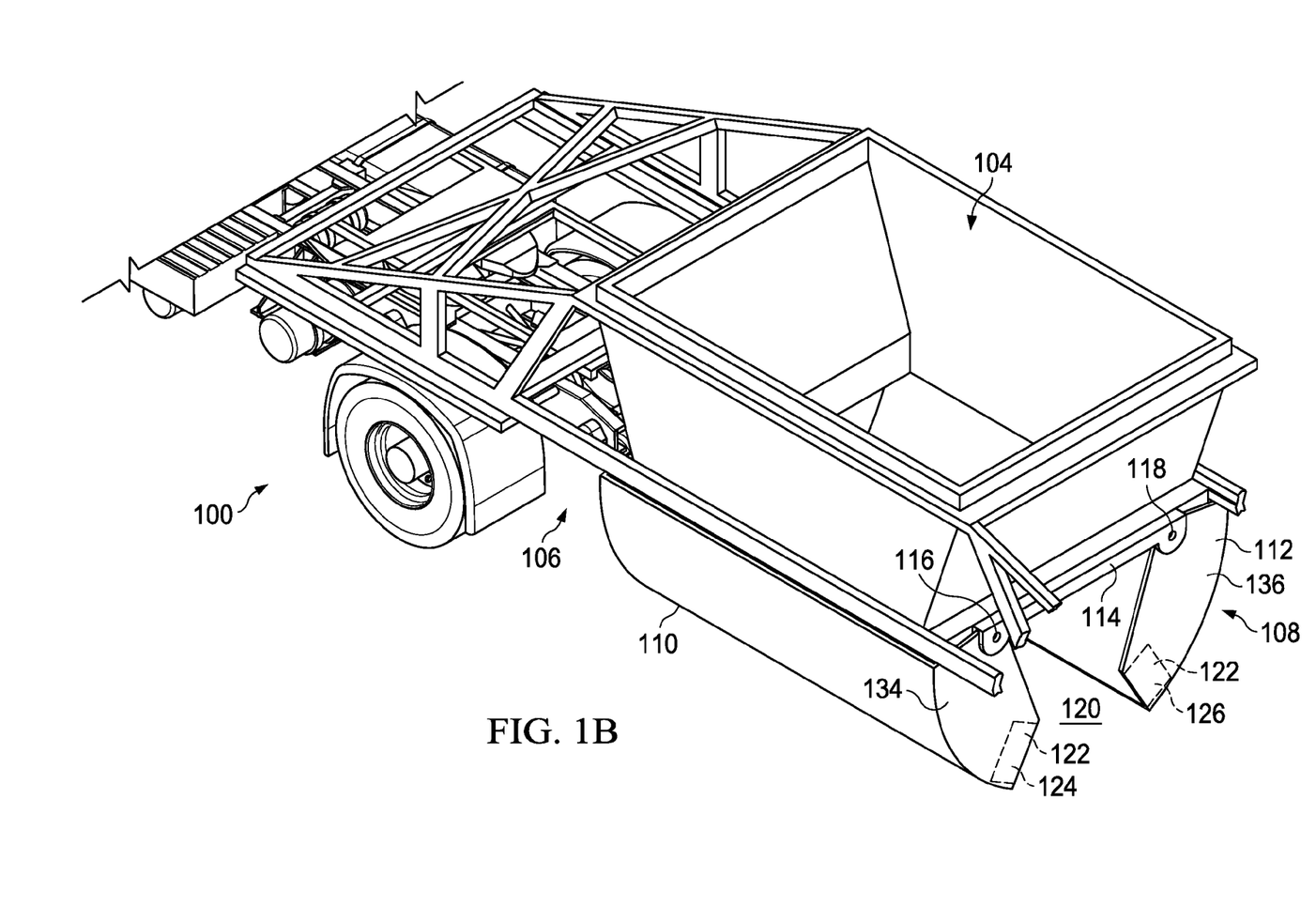
FIG. 1B is a schematic, perspective view of the bottom dump trailer of FIG. 1A in which the gate is an open position.

Referring to FIGS. 1A and 1B, a non-limiting example of a bottom dump trailer 100 and a vehicle 102 is shown in which the illustrative embodiments may be implemented. The bottom dump trailer 100 may be hitched, or otherwise coupled, to any type of vehicle 102, including the truck shown in FIG. 1A. Unless otherwise indicated, as used herein, "or" does not require mutual exclusivity. Also, as used herein, the term "coupled" includes coupling via a separate object and includes direct coupling. The term "coupled" also encompasses two or more components that are continuous with one another by virtue of each of the components being formed from the same piece of material. Also, the term "coupled" may include chemical, such as via a chemical bond, mechanical, thermal, magnetic, or electrical coupling.

The bottom dump trailer 100 includes a holding compartment 104 in which a material may be held or contained. Non-limiting examples of the types of material that may be held by the holding compartment 104 include gravel, sand, asphalt, clinkers, snow, wood chips, triple mix, dirt, rocks, wood, or any other type of material capable of being dumped.

The bottom dump trailer 100 may be capable of dumping the material in the holding compartment 104 through the bottom 106 of the bottom dump trailer 100 using a movable gate 108. The gate 108 may include a first door 110 and a second door 112, each of which may be rotatably mounted or coupled to an adjacent component or components of the bottom dump trailer 100, such as beam 114. By rotating or pivoting at hinges 116, 118, the first and second doors 110, 112 are able to move away and toward each other to open and close the gate 108. FIG. 1A shows the gate 108 in the closed position and FIG. 1B shows the gate 108 in the open position. When in the closed position, the first and second doors 110, 112 are moved against or adjacent one another to prevent material in the holding compartment 104 from falling to the ground. When moving to the open position, the first and second doors 110 and 112 move apart from one another to form an opening 120 therebetween through which material in the holding compartment 104 may be dumped onto the ground.

In one embodiment, the gate 108 includes a securing mechanism 122 that may be used to restrain or prevent the gate 108 from opening. For example, the securing mechanism 122, when locked, may prevent the first door 110 from moving away from the second door 112, thereby preventing the opening 120 from being created. A general description of the securing mechanism 122 is provided in conjunction with FIGS. 1A and 1B, while illustrative structural and operational embodiments are provided in the figures that follow.

In one embodiment, the securing mechanism 122 includes a first securing mechanism portion 124 that is coupled to the first door 110 of the gate 108. The securing mechanism 122 may also include a second securing mechanism portion 126 that is coupled to the second door 112 of the gate 108. The first securing mechanism portion 124 may be engageable with the second securing mechanism portion 126 when the gate 108 is closed, and may be lockable to each another to prevent the gate 108 from opening.

The first door 110 and the second door 112 may each include vertical walls 134 and 136, respectively, which are substantially perpendicular to the ground. In one embodiment, the first securing mechanism portion 124 is coupled to the vertical wall 134 of the first door 110, and the second securing mechanism portion 126 is coupled to the vertical wall 136 of the second door 112. Also, the securing mechanism 122, instead of being coupled to the vertical walls 134, 136 at the rear-facing section of the gate 108, may be coupled to the vertical walls (not shown) that face the vehicle 102 or the front of the bottom dump trailer 100. In other embodiments, the securing mechanism 122 may be mounted, or otherwise coupled, to any surface of the gate 108, including the bottom of the gate 108.

The gate 108 may be opened and closed using any motivating, biasing, or moving means, including a hydraulic cylinder or other actuator, a motor, manually, etc. Furthermore, the securing mechanism 122 may, in one embodiment, be coupled to the motivating, biasing, or moving means that opens and closes the gate 108. For example, one or more components of the securing mechanism 122 may be coupled to a hydraulic cylinder that opens and closes the gate 108.

The securing mechanism 122 may also include an electrical actuator (not shown in FIGS. 1A or 1B, but shown in the figures that follow). In one embodiment, the electrical actuator moves a component of the securing mechanism 122 between locked and unlocked positions, thereby locking or unlocking the securing mechanism 122. The component that is moved by the electrical actuator may vary, and is described in further detail below. When the electrical actuator moves the securing mechanism component into the locked position while the gate 108 is closed, the gate 108 is restrained or prevented from opening.

The electrical actuator may move the component of the securing mechanism 122 into a locked or unlocked position in response to a switch that controls the electrical actuator. The switch, an embodiment of which is shown below is FIG. 6, may be in electrical communication with the electrical actuator and may be located anywhere on the vehicle 102 or the bottom dump trailer 100, including inside a vehicle cabin 130 of the vehicle 102. In another embodiment, the switch may be portable with a user, such as on a keychain of a driver of the vehicle 102.

The electrical actuator may be "electrical" in the sense that it utilizes electrical energy to move between an extended and retracted position. While the illustrative embodiments may utilize an electrical actuator, the securing mechanism 122 may utilize any type of actuator operable by a wide variety of energy sources, including hydraulic fluid pressure or pneumatic pressure. Several types of actuators are usable in the illustrative embodiments, such as pneumatic actuators, hydraulic actuators, linear actuators, piezoelectric actuators, amplified piezoelectric actuators, electromechanical actuators, etc.

In the embodiment in which the actuator is an electrical actuator, the electrical actuator may receive electrical energy from a power source 128 located on the vehicle 102, the bottom dump trailer 100, or a combination thereof. The power source 128 for the electrical actuator may be, e.g., a battery (e.g., 12 volt battery), an alternator, etc. In one specific non-limiting example, the electrical actuator may receive electrical energy from the same battery or batteries used by the vehicle 102.

It will be appreciated that the illustrative embodiments may be implemented on bottom dump trailers having configurations different from that illustrated in FIGS. 1A and 1B. For example, the doors 110 and 112 shown in FIGS. 1A and 1B open to form the longitudinal opening 120, which runs along a portion of the length of the bottom dump trailer 100. However, the doors 110 and 112 may be rotated 90 degrees so that each door 110 and 112 extends from one side of the bottom dump trailer 100 to the other and, when opened, a lateral opening is formed from one side of the bottom dump trailer 100 to the other. In another embodiment, the gate 108 may be a sliding gate instead of a clam-shell type gate. In another embodiment, the securing mechanism 122 may be used on a semi trailer or a double or triple bottom dump trailer, or a side dump truck or trailer. In another embodiment, the securing mechanism 122 may be used with an end dump or super dump truck or trailer. Indeed, the securing mechanism described in the illustrative embodiments may be used in conjunction with a wide variety of dump truck and trailer configurations.

Figure 2A:
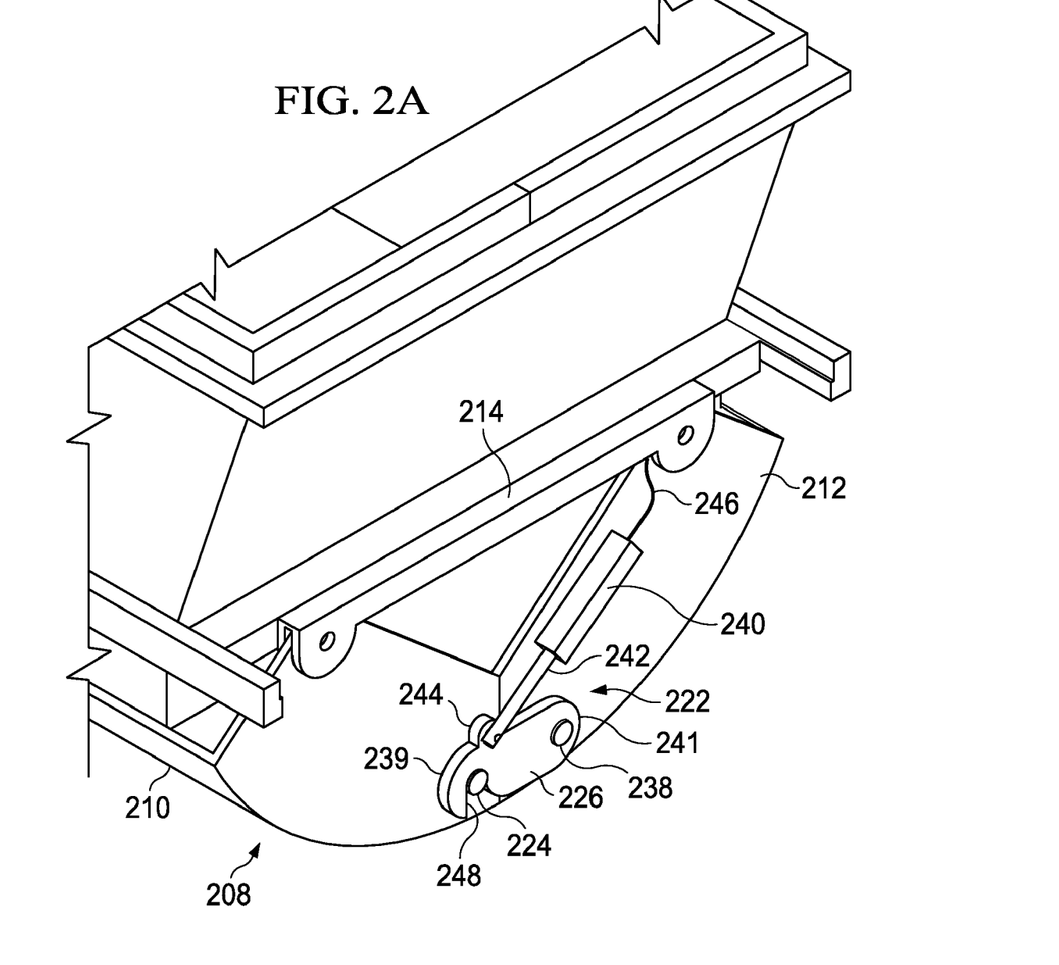
FIG. 2A is a schematic, perspective view of a securing mechanism that utilizes a latch according to an illustrative embodiment.
Figure 2B:
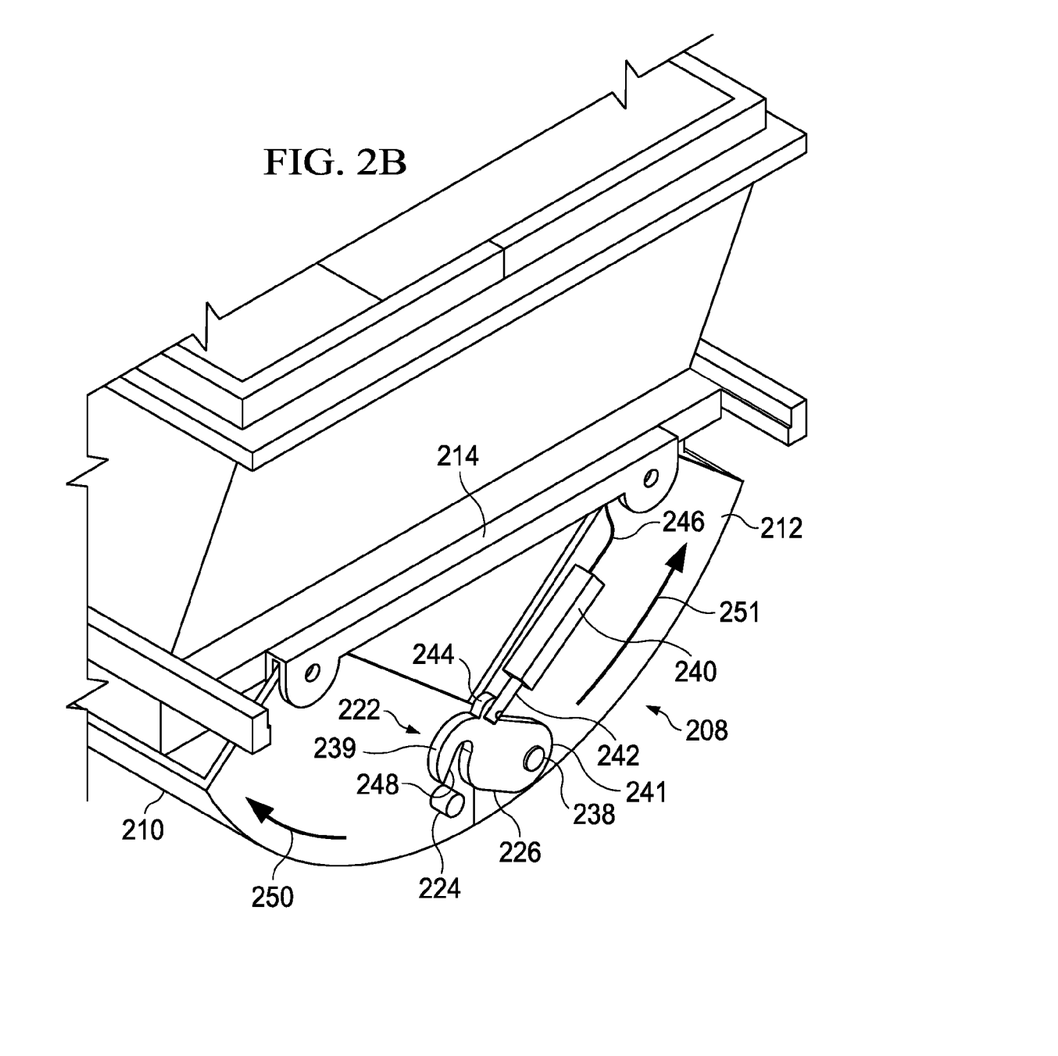
FIG. 2B is a schematic, perspective view of the securing mechanism in FIG. 2A in an unlocked position.

Referring to FIGS. 2A and 2B, an illustrative embodiment of the securing mechanism 222 includes a pin 224 coupled to the first door 210 of the gate 208 and a latch 226 that is rotatably coupled to the second door 212 of the gate 208. Elements of FIGS. 2A and 2B that are analogous to elements in FIGS. 1A and 1B have been shown by indexing the reference numerals by 100. In one embodiment, the latch 226 is rotatably coupled to a latch pin 238, which is, in turn, coupled to the second door 212 of the gate 208. The latch 226 is movable between a locked position, shown. in FIG. 2, and an unlocked position, shown in FIG. 2B. When the latch 226 is moved into the unlocked position, the latch 226 may be moved any distance or angle from the position of the latch 226 in the locked position (e.g., 3 inches, 6 inches, 12 inches, 10 decrees, 30 degrees, 90 degrees, 120 degrees, etc.)

In one embodiment, the latch 226 may have rounded ends 239, 241, and may generally be shaped as an approximately or substantially straight beam. In embodiment, the rounded ends 239, 241 may help the latch 226 to contour or structurally mate with a support for the pin 224 or the latch pin 238 (as described in more detail below), although the rounded ends 239, 241 may be useful for variety of purposes. However, the latch 226 may be any shape that allows the latch 226 to engage with the pin 224.

The latch 226 may be moved between the locked and unlocked positions by the electrical actuator 240, which may, in one embodiment, be a linear actuator. The electrical actuator 240 may include a slidable shaft 242 that is coupled to the latch 226 by any means, such as the rotatable joint 244 shown in FIGS. 2A and 2B. Further, the electrical actuator 240 may be in electrical communication with a switch and/or receive electrical energy from a power source via an electrical conduit 246.

In one embodiment, the electrical actuator 240 is coupled to the same door (in this case, the second door 212) as the latch 226. However, the electrical actuator 240 may be coupled to any component on the bottom dump trailer 100 or the securing mechanism 222 that allows the electrical actuator 240 to move the latch 226 between the locked and unlocked positions, including the first door 210, the beam 214, or any structure of the bottom dump trailer 100 proximate to securing mechanism 222.

In one embodiment, the latch 226 includes a notch 248 sized to receive the pin 224. In one embodiment, the notch 248 may be U-shaped to contour the pin 224 or other component to which the latch 226 may engage. When the gate 208 is closed, the electrical actuator 240 may be activated, using, e.g., a switch, to extend the shaft 242, and therefore to move the latch 226 into the locked position shown in FIG. 2A so that the pin 224 is received by the notch 248 in the latch 226. Engaging the latch 226 with the pin 224 in this manner may prevent the first door 210 from moving apart from the second door 212.

To unlock the gate 208 so that the first and second doors 210, 212 may be moved apart from one another, the electrical actuator 240 may be retracted as shown in FIG. 2B so that the latch 226 is disengaged from the pin 224. Once the securing mechanism 222 has been disengaged, the first and second doors 210, 212 may be opened in the directions indicated by the arrows 250, 251, respectively, shown in FIG. 2B.

Figure 3A:
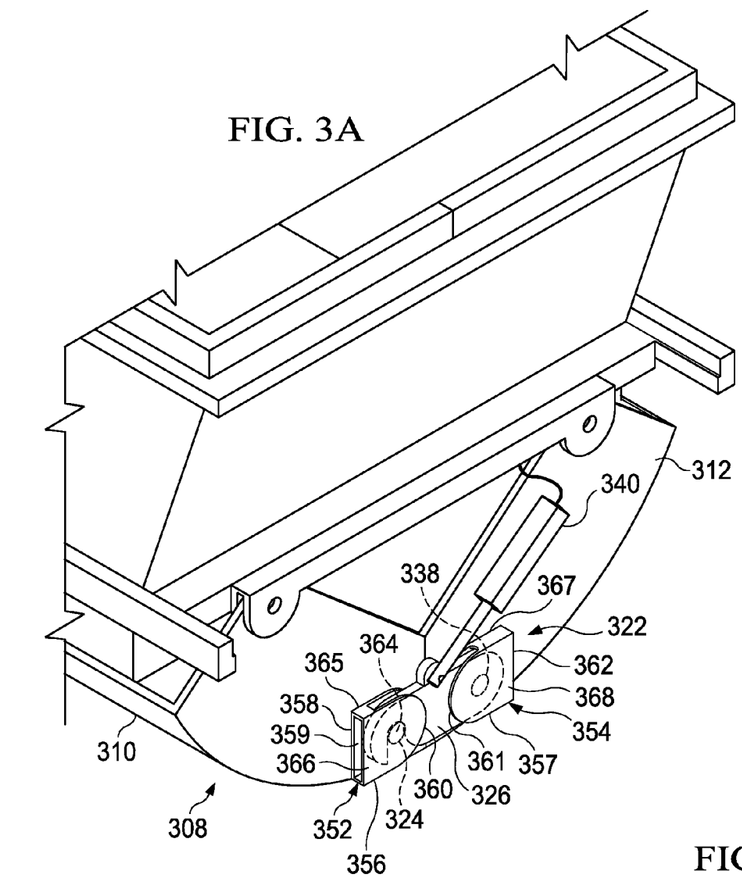
FIG. 3A is a schematic, perspective view of a securing mechanism that utilizes a latch, a pin support, and a latch pin support according to an illustrative embodiment.
Figure 3B:
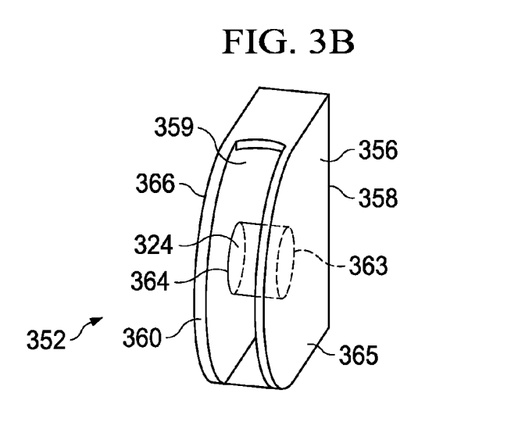
FIG. 3B is a schematic, perspective view of the pin support in FIG. 3A.

Referring to FIGS. 3A and 3B, an illustrative embodiment of the securing mechanism 322 includes a pin support 352 and a latch pin support 354. Elements of FIGS. 3A and 3B that are analogous to elements in FIGS. 1A and 1B have been shown by indexing the reference numerals by 200. The pin support 352 may include a first inner plate 365 and a first outer plate 366, and the first inner plate 365 may coupled to the first door 310 of the gate 308. The pin 324 may be coupled to the pin support 352 such that the pin 324 is disposed between the first inner plate 365 and the first outer plate 366 and such that the pin 324 is coupled to the first door 310 via the pin support 352. The latch pin support 354 may include a second inner plate 367 and a second outer plate 368, and the second inner plate 367 may be coupled to the second door 312 of the gate 308. The latch pin 338 may be coupled to the latch pin support 354 such that the latch pin 338 is disposed between the second inner plate 367 and the second outer plate 368 and such that the latch pin 338 is coupled to the second door 312 via the latch pin support 354.

The first inner and outer plates 365, 366 of the pin support 352 may be fixedly coupled to one another directly, or indirectly via the pin 324 and/or any other joining structure. Likewise, the second inner and outer plates 367, 368 of the latch pin support 354 may be fixedly coupled to one another directly, or indirectly via the latch pin 338 and/or any other joining structure.

In one embodiment, both the pin support 352 and the latch pin support 354 may be formed using first and second tubular beams 356 and 357, respectively, which may each have a substantially rectangular lateral cross-section. The substantially rectangular lateral cross-section of the first tubular beam 356 is illustrated in FIG. 3A at the end 358 of the first tubular beam 356. In other embodiments, the first and second tubular beams 356, 357 may have other lateral cross-sectional shapes (e.g., circle, oval, square, polygonal, etc.).

Each of the first and second tubular beams 356, 357 may form an internal channel. The internal channel 359 of the first tubular beam 356 is shown in FIGS. 3A and 3B. Also, one end 360 of the pin support 352 may be rounded, while the other end 358 may be substantially flat. Likewise, the latch pin support 354 may have a rounded end 361 and a straight or substantially flat end 362.

In the embodiment in which the pin support 352 and/or the latch pin support 354 are formed from the tubular beams 356, 357, respectively, the pin 324 may be disposed within the internal channel 359 of the pin support 352, and the latch pin 338 may be disposed within the internal channel of the latch pin support 354. With particular regard to the pin support 352 and referring to FIG. 3B, the pin 324 may have a first end 363 and a second end 364. The first end 363 of the pin 324 may be coupled to the first inner plate 365 and the second end 364 of the pin 324 may be coupled to a first outer plate 366 of the pin support 352. In one embodiment, the pin support 352 shown in FIG. 3B is constructed analogously to the latch pin support 354, including the coupling of the ends of the latch pin 338 to the second inner plate 367 and the second outer plate 368.

While the pin support 352 and the latch pin support 354 are described above as being formed from the first and second inner and outer plates 365, 366, 367, 368 and/or the first and second tubular beams 356, 357, respectively, the pin support 352 and the latch pin support 354 may be any structure having any shape that supports the pin 324 and/or the latch pin 338, respectively. Indeed, the possible shapes of the pin support 352 and the latch pin support 354 are numerous, and may differ from those shown in FIGS. 3A and 3B.

The pin support 352 and the latch pin support 354 may provide additional stability to the pin 324 and the latch pin 338, respectively, and may also provide a means of coupling the pin 324 to the first door 310 and the latch pin 338 to the second door 312. In addition to including both the pin support 352 and the latch pin support 354, the securing mechanism 322, in another embodiment, may include only one of the pin support 352 or the latch pin support 354.

Figure 4A:
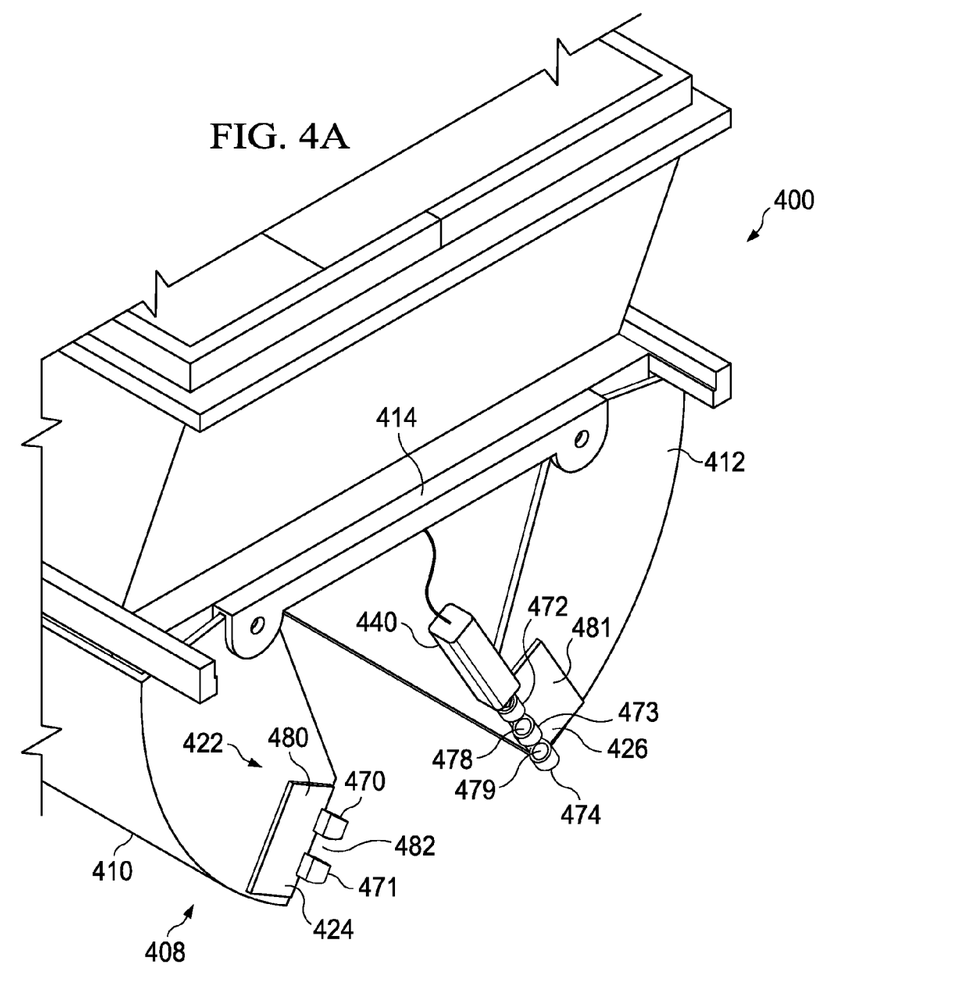
FIG. 4A is a schematic, perspective view of a securing mechanism that utilizes interlockable members having interlockable teeth according to an illustrative embodiment.
Figure 4B:
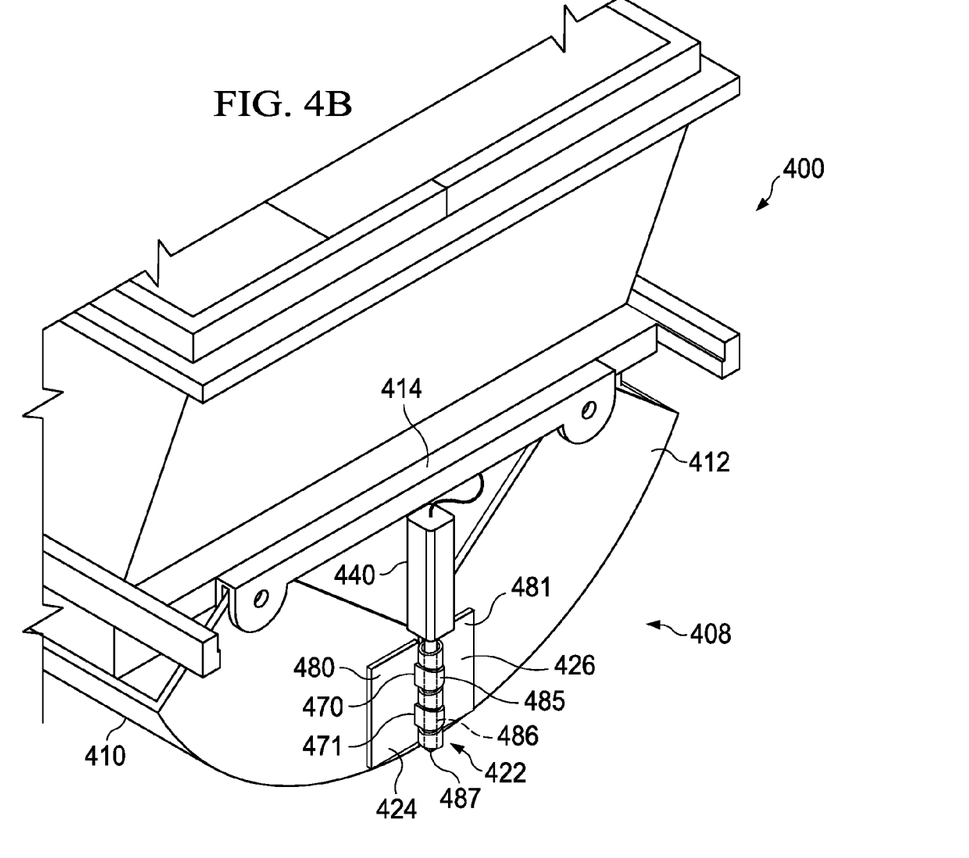
FIG. 4B is a schematic, perspective view of the securing mechanism in FIG. 4A in which the interlockable members are engaged and locked.
Figure 4C:
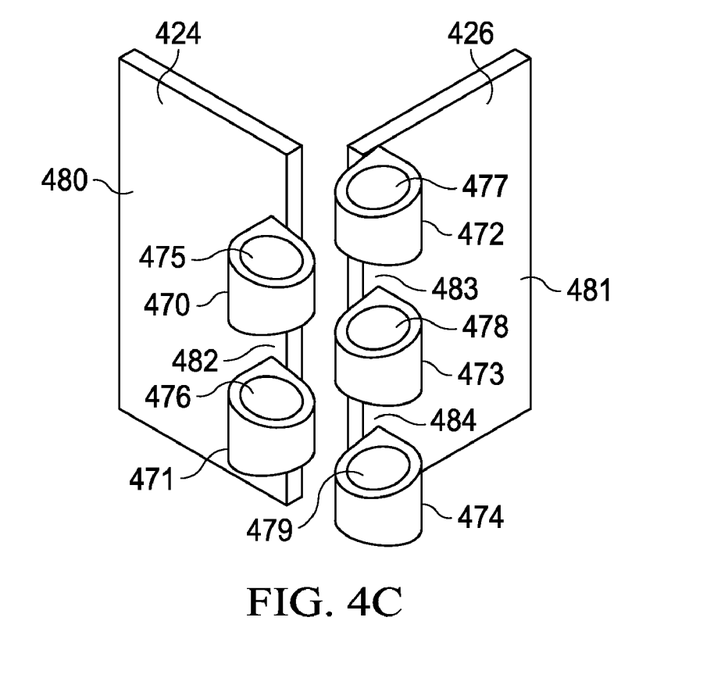
FIG. 4C is a schematic, perspective view of the interlockable members shown in FIG. 4A and FIG. 4B.

Referring to FIGS. 4A, 4B, and 4C, an illustrative embodiment of the securing mechanism 422 includes a first interlockable member 424 having one or more interlockable teeth 470, 471 and a second interlockable member 426 having one or more interlockable teeth 472, 473, 474. Elements of FIGS. 4A, 4B, and 4C that are analogous to elements in FIG. 1A and 1B have been shown by indexing the reference numerals by 300. Each of the interlockable teeth 470, 471, 472, 473, 474 may form a respective passage 475, 476, 477, 478, 479 having any internal shape (e.g., circular, oval, square, rectangle, etc.).

In one embodiment, the first interlockable member 424 may include a first plate portion 480 that may be coupled to the first door 410 of the gate 408. The second interlockable member 426 may include a second plate portion 481 that may be coupled to the second door 412 of the gate 408.

In one embodiment, the first interlockable member 424 is engaged with the second interlockable member 426 when the gate 408 is closed, as shown in FIG. 4B. In particular, interlockable teeth 470 and 471 of the first interlockable member 424 may be spaced to form a gap 482 that accepts the interlockable tooth 473 of the second interlockable member 426 when the first and second interlockable members 424 and 426 are engaged. Also, the interlockable teeth 472, 473, and 474 of the second interlockable member 426 may be spaced to form gaps 483 and 484 that accept the interlockable teeth 470 and 471, respectively, of the first interlockabie member 424 when the first and second interlockable members 424 and 426 are engaged.

When the first and second interlockable members 424 and 426 are engaged, as shown in FIG. 4B, the passages 475, 476, 477, 478, 479 of the interlockable teeth 470, 471, 472, 473, 474, respectively, may form a composite passage 485. While the gate 408 is closed and the composite passage 485 is formed by the passages 475, 476, 477, 478, 479, the electrical actuator 440 may be activated to extend a pin 486 fully or partially through the composite passage 485 so that the pin 486 is in a locked position. The pin 486 may be coupled to the electrical actuator 440 so that the electrical actuator 440 may extend or retract the pin 486. The electrical actuator 440 may be caused to extend the pin 486 into the composite passage 485 by the selection of a switch. When the pin 486 has been moved into the locked position by the electrical actuator 440, as depicted in FIG. 4B, the first and second doors 410, 412 of the gate 408 are restrained or prevented from moving away from one another. When it is desired to open the gate 408, the electrical actuator 440 may retract, or unlock, the pin 486 from the composite passage 485 so that the gate 408 may be opened.

The pin 486 may be sized to fit into the composite passage 485, and may have any lateral cross-sectional shape. Also, the pin 486 may include a tapered end 487, which may help to guide the pin 486 into the composite passage 485 when the pin 486 is moved into the locked position.

As shown in FIGS. 4A and 4B, the electrical actuator 440 is coupled to the same door 412 as the second interlockable member 426. However, in other embodiments, the electrical actuator 440 may be coupled to the first door 410, the beam 414, or any other structure on the bottom dump trailer 400 that permits the electrical actuator 440 to engage the pin 486 with the composite passage 485.

It will be appreciated that each of the first and second interlockable members 424, 426 may include any number of interlockable teeth or hooks. For example, each of the first and second interlockable members 424, 426 may include a single tooth, or any other number of teeth.

Figure 5A:
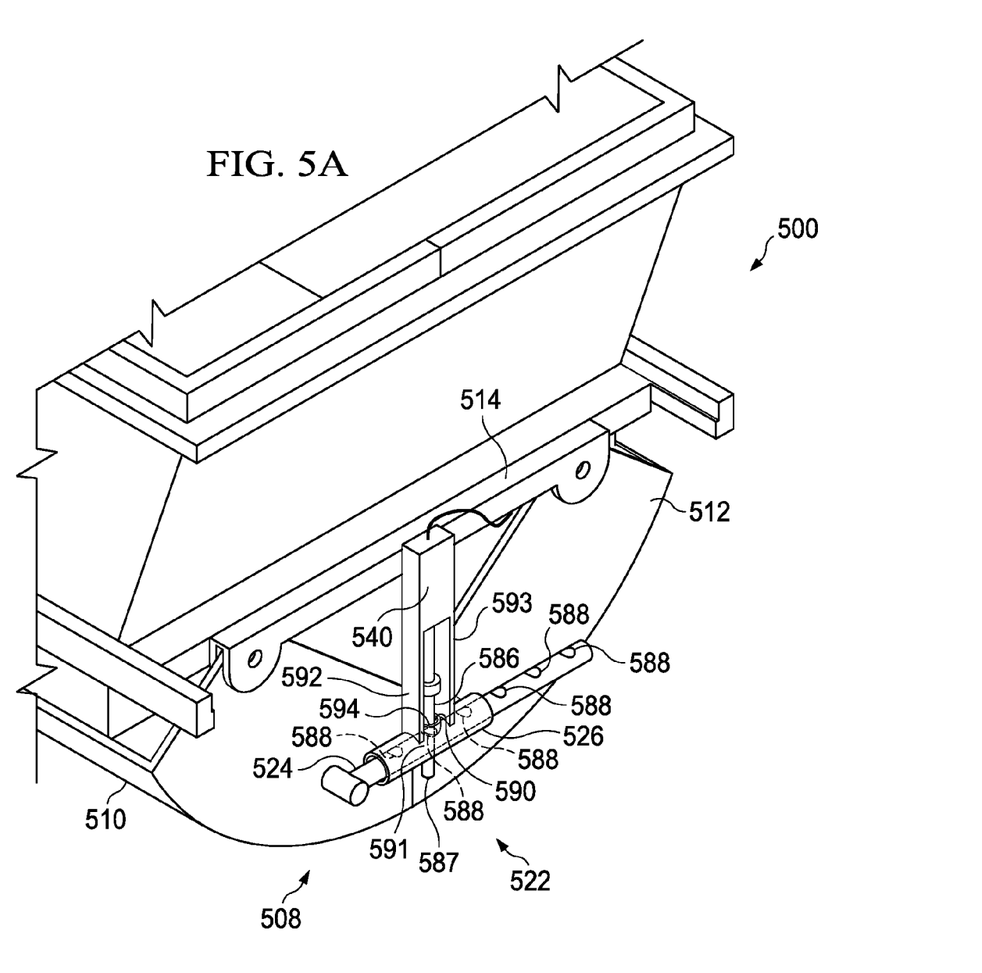
FIG. 5A is a schematic, perspective view of a securing mechanism that utilizes a rod slidable within an outer conduit according to an illustrative embodiment.
Figure 5B:
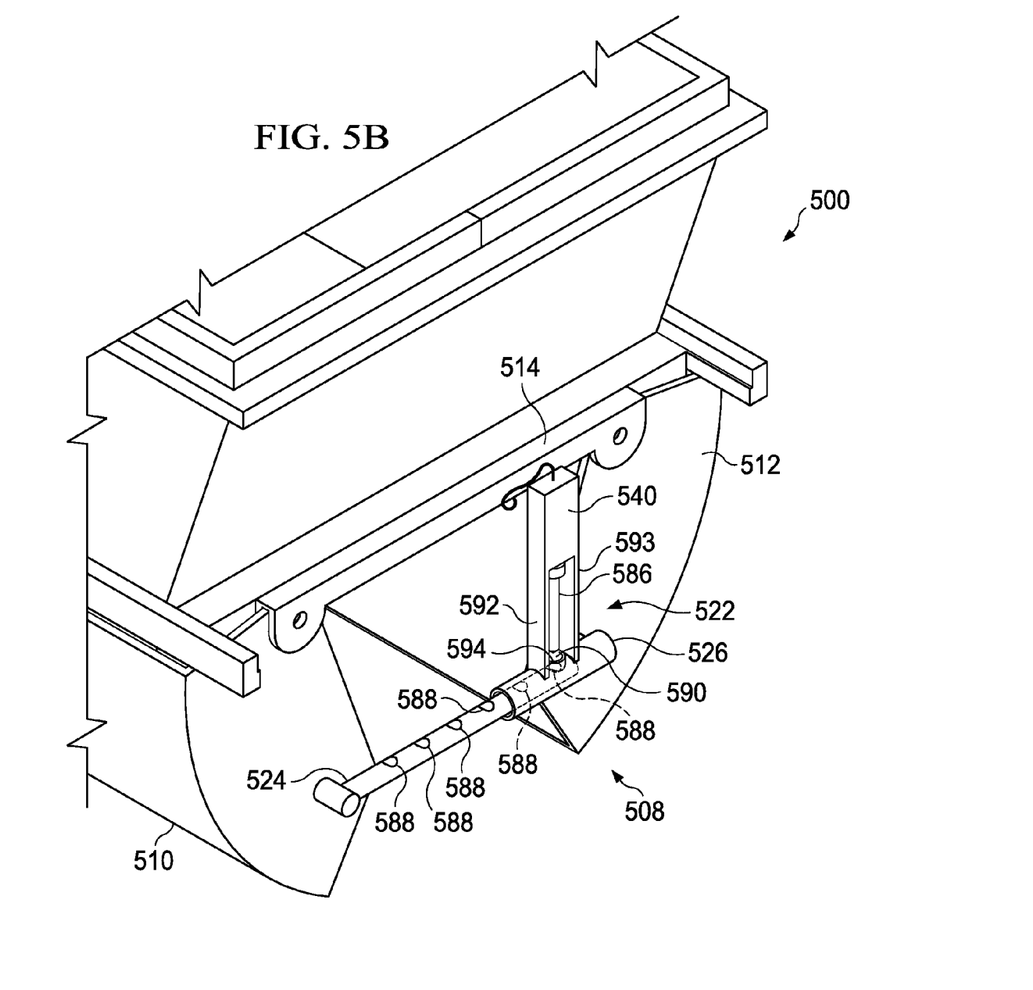
FIG. 5B is a schematic, perspective view of the securing mechanism of FIG. 5A in which the securing mechanism is unlocked and the gate is in an open position.

Referring to FIGS. 5A and 5B, an illustrative embodiment of the security mechanism 522 includes a rod 524 that is slidable within an outer conduit 526. Elements of FIGS. 5A and 5B that are analogous to elements in FIGS. 1A and 1B have been shown by indexing the reference numerals by 400. The rod 524 may be coupled to the first door 510 of the gate 508, and the outer conduit 526 may be coupled to the second door 512 of the gate 508. The rod 524 may be sized to fit within the outer conduit 526. FIG. 5A shows the security mechanism 522 in the locked position while the gate 508 is closed, and FIG. 5B shows the securing mechanism 522 in the unlocked position while the gate 508 is opened.

The rod 524 may include one or more lateral holes 588. In one embodiment, each of the lateral holes 588 may extend laterally through the rod 524 to reach an opposite side of the rod 524, though this is not necessarily required. Also, the rod 524 may be hollow, solid, or any state in between.

The outer conduit 526 may include a lateral hole 590, which may include a coincidental lateral hole on the opposite side of the outer conduit 526 so that the pin 586 may extend laterally through the outer conduit 526, as shown in FIG. 5A.

When the securing mechanism 522 is in the unlocked position, the electrical actuator 540 may retract the pin 586 so that the rod 524 may freely and slidably move along the inner passage of the outer conduit 526. Thus, when the securing mechanism 522 is unlocked, the gate 508 may be opened. To lock the gate 508, the gate 508 may be closed such that one of the lateral holes 588 of the rod 524 is aligned, or is substantially coincidental with, the lateral hole 590 of the outer conduit 526. It will be appreciated that any of the lateral holes 588 of the rod 524 may be aligned with the lateral hole 590 of the outer conduit 526, thereby allowing the gate 508 to be locked in a variety of positions, including partially opened positions. The other embodiments described herein may also allow for the gate to be locked in a partially open position.

When one of the lateral holes 588 of the rod 524 has been aligned with the lateral hole 590 of the outer conduit 526, the electrical actuator 540 may extend the pin 586 into the composite passage 591 formed by one of the lateral holes 588 of the rod 524 and the lateral hole 590 of the outer conduit 526, thereby disposing the pin 586 into the locked position. The pin 586 may be sized to fit into the composite passage 591. Also, the pin 586 may include a tapered end 587 that facilitates the entry of the pin 586 into the composite passage 591. Once the pin 586 has been extended into the locked position by entering the composite passage 591, the first door 510 is restrained or prevented from moving apart from the second door 512.

As shown in FIGS. 5A and 5B, the electrical actuator 540 may be coupled to the outer conduit 526 via one or more brackets 592, 593. However, the electrical actuator 540 may be coupled, in other embodiments, to the rod 524, either or both of the doors 510, 512, the beam 514, or any other structure of the bottom dump trailer 500 at or near the securing mechanism 522.

Also, in any of the illustrative embodiments described herein, either or both of the rod 524 or the outer conduit 526 may be coupled to the first door 510 or the second door 512, respectively, via a hydraulic cylinder that may be used to open and close the gate 508. For example, the outer conduit 526 may be coupled to a cylinder barrel (not shown) that is, in turn, coupled to the second door 512. Likewise, the rod 524 may be coupled to a component that is coupled to the first door 510.

In one embodiment, the outer conduit 526 may include an entry guide 594 formed around the perimeter of the lateral hole 590 of the outer conduit 526. In the non-limiting example of FIGS. 5A and 5B, the entry guide 594 is a hollow cylinder sized to receive the pin 586. In another embodiment, the entry guide 594 may be funnel-shaped. The entry guide 594 may guide the pin 586 into the lateral hole 590 when the electrical actuator 540 moves the pin 586 into the locked position.

Figure 6:
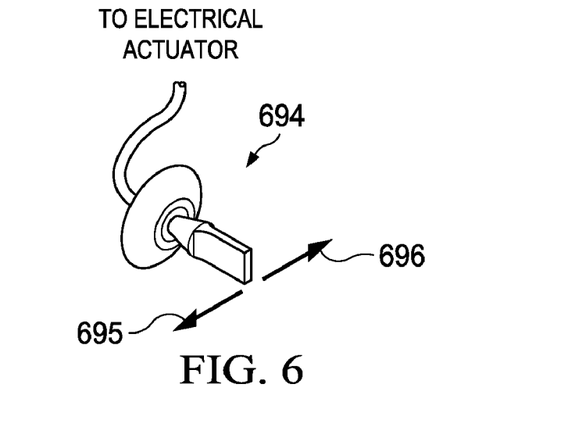
FIG. 6 is a schematic, perspective view of a switch that may be used to lock or unlock the securing mechanism according to an illustrative embodiment.

Referring to FIG. 6, an illustrative embodiment of a switch 694 that may be coupled, electrically or mechanically, to the electrical actuator is movable into a first position 695 and a second position 696. In one embodiment, when the switch 694 is moved to the first position 695, the electrical actuator draws upon the power source, such as the power source 128 shown in FIG. 1A, to move a component of the securing mechanism to the locked position (e.g., a latch, a pin, etc.). When the switch 694 is moved into the second position 696, the electrical actuator may be caused to move the component (e.g., a latch, a pin, etc.) to the unlocked position.

As described above, the switch 694 may be located anywhere on the vehicle 102 or the bottom dump trailer 100 shown in FIGS. 1A and 1B. In one example, the switch 694 may be included in the vehicle cabin 130 of the vehicle 102 shown in FIG. 1A to conveniently allow a person in the vehicle cabin 130 to lock and unlock the securing mechanism. In another embodiment, the switch 694 may be located on an area of a vehicle or bottom dump trailer other than the vehicle cabin. In one embodiment, the switch 694 may be portable with a driver or user, such as on the driver's keychain, and may also wirelessly communicate with the electrical actuator.

Figure 7:
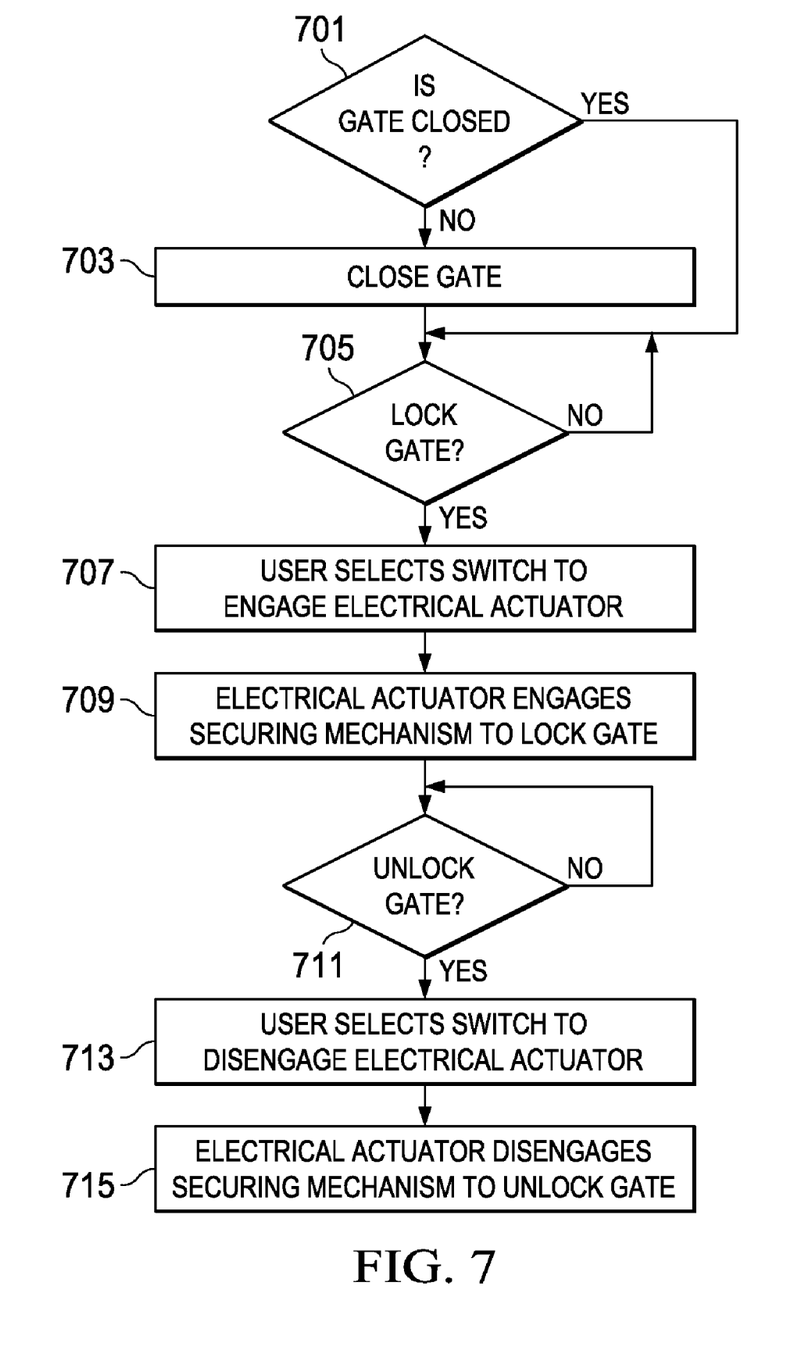
FIG. 7 is a flowchart of a process for locking or unlocking the gate of a bottom dump trailer using a securing mechanism according to an illustrative embodiment.

Referring to FIG. 7, an illustrative embodiment of a process for locking a bottom dump trailer using a securing mechanism includes determining whether the gate is closed (step 701). If the process determines that the gate is closed, the process proceeds to step 705. Returning to step 701, if the process determines that the gate is not closed, then the gate may be closed (step 703).

It may be determined whether the gate is to be locked (step 705). If not, the process may repeat step 705 at some later time or simply end. If it is determined that the gate is to be locked, the user may select a switch to engage the electrical actuator (step 707). The electrical actuator may then engage the securing mechanism to lock the gate (step 709).

It may then be determined whether the gate is to be unlocked (step 711). If not, step 711 may be repeated at some later time or the process may simply end. If it is determined that the gate is to be unlocked, the user may select a switch to disengage the electrical actuator (step 713). The electrical actuator may then disengage the securing mechanism to unlock the gate (step 715). The gate may then be opened.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

As used herein, including in the claims, the terms first, second, third, etc. . . . used in relation to an element (e.g., first door, second door, etc.) are for reference or identification purposes only, and these terms, unless otherwise indicated, are not intended to describe or suggest a number, order, source, purpose, or substantive quality for any element for which such a term is used.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A securing mechanism for a gate of a bottom dump trailer, the securing mechanism comprising:
    a pin adapted to be coupled to a first door of the gate of the bottom dump trailer;
    a latch adapted to be rotatably coupled to a second door of the gate of the bottom dump trailer, the latch movable into a plurality of positions comprising a locked position and an unlocked position, the latch comprising a notch adapted to receive the pin when the latch is in the locked position;
    an electrical actuator adapted to use electrical energy to move the latch between the locked position and the unlocked position, the electrical actuator further adapted to move, while the gate is closed, the latch into the locked position to engage the notch to the pin, the gate restrained from opening when the notch and the pin are engaged;
    a latch pin coupled to the second door of the gate of the bottom dump trailer, wherein the latch is rotatably coupled to the latch pin;
    a pin support coupled to the first door of the gate of the bottom dump trailer, the pin coupled to the first door of the gate via the pin support; and
    a latch pin support coupled to the second door of the gate of the bottom dump trailer, the latch pin coupled to the second door of the gate via the latch pin support;
    wherein the pin support comprises a first inner plate and a first outer plate, the pin support coupled to the first door of the gate via the first inner plate, the pin comprising a first end and a second end, the first end of the pin coupled to the first inner plate and the second end of the pin coupled to the first outer plate such that the pin is disposed between the first inner plate and the first outer plate; and
    wherein the latch pin support comprises a second inner plate and a second outer plate, the latch pin support coupled to the second door of the gate via the second inner plate, the latch pin comprising a first end and a second end, the first end of the latch pin coupled to the second inner plate and the second end of the latch pin is coupled to the second outer plate such that the latch pin is disposed between the second inner plate and the second outer plate.

2. The securing mechanism of claim 1, wherein the electrical actuator is coupled to the second door of the gate of the bottom dump trailer.

3. A securing mechanism for a gate of a bottom dump trailer, the securing mechanism comprising:
- a pin adapted to be coupled to a first door of the gate of the bottom dump trailer;
- a latch adapted to be rotatably coupled to a second door of the gate of the bottom dump trailer, the latch movable into a plurality of positions comprising a locked position and an unlocked position, the latch comprising a notch adapted to receive the pin when the latch is in the locked position;
- an electrical actuator adapted to use electrical energy to move the latch between the locked position and the unlocked position, the electrical actuator further adapted to move, while the gate is closed, the latch into the locked position to engage the notch to the pin, the gate restrained from opening when the notch and the pin are engaged;
- a latch pin coupled to the second door of the gate of the bottom dump trailer, wherein the latch is rotatably coupled to the latch pin;
- a pin support coupled to the first door of the gate of the bottom dump trailer, the pin coupled to the first door of the gate via the pin support; and
- a latch pin support coupled to the second door of the gate of the bottom dump trailer, the latch pin coupled to the second door of the gate via the latch pin support;
- wherein the pin support comprises a first tubular beam forming an internal channel, the first tubular beam having a substantially rectangular lateral cross section, the first tubular beam having a first inner plate and a first outer place, the pin comprising a first end and a second end, the first end of the pin coupled to the first inner plate and the second end of the pin coupled to the first outer plate such that the pin is disposed within the internal channel of the first tubular beam; and
- wherein the latch pin support comprises a second tubular beam forming an internal channel, the second tubular beam having a substantially rectangular lateral cross section, the second tubular beam having a second inner plate and a second outer place, the latch pin comprising a first end and a second end, the first end of the latch pin coupled to the second inner plate and the second end of the latch pin coupled to the second outer plate such that the latch pin is disposed within the internal channel of the second tubular beam.

4. The securing mechanism of claim 3, wherein the electrical actuator is coupled to the second door of the gate of the bottom dump trailer.

5. A securing mechanism for a gate of a bottom dump trailer, the securing mechanism comprising:
- a pin support comprising a first inner plate and a first outer plate, the first inner plate adapted to be coupled to a first door of the gate of the bottom dump trailer;
- a pin comprising a first end and a second end, the first end of the pin coupled to the first inner plate and the second end of the pin coupled to the first outer plate such that the pin is disposed between the first inner plate and the first outer plate;
- a latch pin support comprising a second inner plate and a second outer plate, the second inner plate adapted to be coupled to a second door of the gate of the bottom dump trailer;
- a latch pin comprising a first end and a second end, the first end of the latch pin coupled to the second inner plate and the second end of the latch pin coupled to the second outer plate such that the latch pin is disposed between the second inner plate and the second outer plate;
- a latch rotatably coupled to the latch pin, the latch movable into a plurality of positions comprising a locked position and an unlocked position, the latch comprising a notch adapted to receive the pin when the latch is in the locked position; and
- an electrical actuator adapted to use electrical energy to move the latch between the locked position and the unlocked position, the electrical actuator adapted to be coupled to the second door of the gate, the electrical actuator further adapted to move, while the gate is closed, the latch into the locked position such that the notch receives the pin, the gate restrained from opening when the notch receives the pin.

6. The securing mechanism of claim 5, wherein each of the first and second doors of the gate comprises a vertical wall substantially perpendicular to the ground;
- wherein the pin support is adapted to be coupled to the vertical wall of the first door; and
- wherein the latch pin support is adapted to be coupled to the vertical wall of the second door.

7. The securing mechanism of claim 5, wherein the first and second doors of the gate are rotatably mounted on the bottom dump trailer, wherein the first and second doors move apart from one another to form an opening when moving into an open position, and wherein the first and second doors move toward one another when moving into a closed position.

8. The securing mechanism of claim 5, wherein the electrical actuator is adapted to receive electrical energy from a power source, the power source located on at least one of the bottom dump trailer or a vehicle coupled to the bottom dump trailer.

9. The securing mechanism of claim 5, further comprising:
- a switch in electrical communication with the electrical actuator, the switch movable into a plurality of positions comprising a first switch position and a second switch position, wherein the electrical actuator moves the latch into the locked position when the switch is in the first switch position, and wherein the electrical actuator moves the latch into the unlocked position when the switch is in the second switch position.

10. The securing mechanism of claim 9, wherein the bottom dump trailer is coupled to a vehicle, the vehicle comprising a vehicle cabin, wherein the switch is located in the vehicle cabin.

* * * * *